United States Patent
Basu

(10) Patent No.: US 11,042,208 B2
(45) Date of Patent: Jun. 22, 2021

(54) THERMAL LEVELING

(71) Applicant: Micron Technology, Inc., Boise, ID (US)

(72) Inventor: Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 147 days.

(21) Appl. No.: 16/296,891

(22) Filed: Mar. 8, 2019

(65) Prior Publication Data
US 2020/0285298 A1    Sep. 10, 2020

(51) Int. Cl.
*G06F 9/50* (2006.01)
*G06F 1/3234* (2019.01)
*G06F 1/3225* (2019.01)

(52) U.S. Cl.
CPC .......... *G06F 1/3275* (2013.01); *G06F 1/3225* (2013.01); *G06F 9/505* (2013.01); *G06F 9/5094* (2013.01)

(58) Field of Classification Search
CPC .............................. G06F 1/3225; G06F 9/5094
See application file for complete search history.

(56) References Cited

U.S. PATENT DOCUMENTS

| | | | |
|---|---|---|---|
| 8,447,872 B2 | 5/2013 | Duerk et al. | |
| 8,472,274 B2 | 6/2013 | Fai et al. | |
| 9,275,741 B1 | 3/2016 | Liang et al. | |
| 9,668,337 B2 | 5/2017 | Stoev et al. | |
| 9,946,481 B2 | 4/2018 | Warriner | |
| 10,007,311 B2 | 6/2018 | Raghu et al. | |
| 2016/0085290 A1* | 3/2016 | Skandakumaran | G06F 1/3253 713/320 |
| 2016/0334992 A1* | 11/2016 | Yashiro | G11C 7/04 |
| 2019/0043559 A1* | 2/2019 | McVay | G06F 3/0634 |
| 2019/0050153 A1* | 2/2019 | Yang | G06F 1/206 |

\* cited by examiner

*Primary Examiner* — Albert Wang
(74) *Attorney, Agent, or Firm* — Brooks, Cameron & Huebsch, PLLC

(57) ABSTRACT

Systems, apparatuses, and methods related to thermal leveling are described. Thermal leveling can be performed on a host computing system as opposed to on a memory system. Thermal leveling can include operations performed by a host to control temperature characteristics and/or power consumption of a memory system. For instance, a host computing system can control temperature characteristics of multiple memory devices that are deployed in a memory system. In an example, a set of processing resources (e.g., a thermal leveling component) can be provided on a host. The set of processing resources can receive information corresponding to thermal characteristics of a memory device coupled to the host and control a thermal setting for the memory device based on the received thermal characteristics.

30 Claims, 4 Drawing Sheets

THERMAL LEVELING

TECHNICAL FIELD

The present disclosure relates generally to semiconductor memory and methods, and more particularly, to apparatuses, systems, and methods for thermal leveling.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
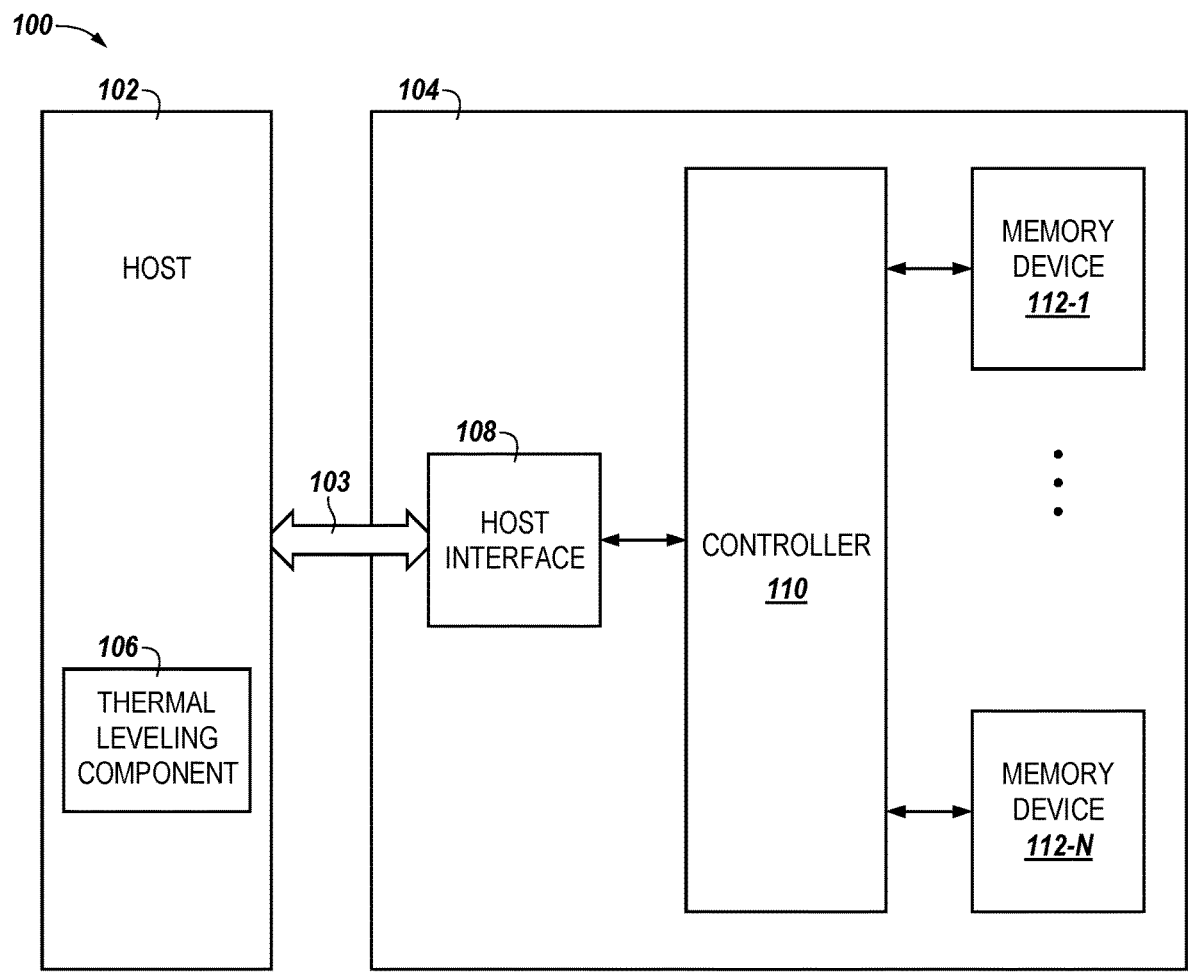
FIG. 1 is a functional block diagram in the form of a computing system including an apparatus including a memory system in accordance with a number of embodiments of the present disclosure.

Systems, apparatuses, and methods related to thermal leveling are described. Thermal leveling can be performed on a host computing system as opposed to on a memory system. Thermal leveling can include operations performed by a host to control temperature characteristics and/or power consumption of a memory system. For instance, a host computing system can control temperature characteristics of multiple memory devices that are deployed in a memory system. In an example, a set of processing resources (e.g., a thermal leveling component) can be provided on a host. The set of processing resources can receive information corresponding to thermal characteristics of a memory device coupled to the host and control a thermal setting for the memory device based on the received thermal characteristics.

Memory devices, such as flash memory devices, may be used to store data in a computing system and can transfer such data between a host associated with the computing system. The data stored in a memory device can be important or even critical to operation of the computing system. Memory devices are utilized as volatile and/or non-volatile memory for a wide range of electronic applications. Flash memory devices typically use a one-transistor memory cell that allows for high memory densities, high reliability, and low power consumption.

Despite their low power consumption, flash memory devices are subject to thermal effects, such as temperature fluctuations, during their course of operation. For example, during the course of operations of a flash memory device, the temperature of the memory device (e.g., the temperature of the die on which the memory device is formed), sectors (e.g., blocks of memory cells, pages of memory cells, arrays of memory cells, etc.) of memory cells, and/or the package (e.g., the housing in which the memory device is manufactured) can be subject to increases and decreases in temperature. These temperature fluctuations can arise as a result of the workload assigned to the memory device, the amount of power supplied to the memory device (e.g., the amount of power supplied to the memory device to handle the workloads assigned to the memory device), the physical location of the memory device, and/or the architecture of the memory device, among other factors.

In general, memory devices have a particular range of temperatures over which they are designed to operate. For example, many memory devices are rated to run between 0° Celsius to 75° Celsius. When the temperature of the memory device exceeds the rated temperature range, the memory device may incur losses in performance, become damaged, or, in some instances, fail. Even if the memory device maintains a temperature within its operating temperature range, damage and/or failure of the memory device can occur if the memory device is exposed to temperatures at the higher end of the operating range for an extended period of time.

In order to protect a memory device from damage and/or failure due to high temperatures, memory devices can be provided with various circuitry and/or components to monitor and/or control the temperature of the memory device. For example, a memory device can include one or more thermal sensors that can detect a temperature of the memory device and/or the package in which the memory device is manufactured. In addition, a memory device can include one or more heat dissipation components, such as heat sinks, fans, liquid cooling components, and the like.

In some approaches, the heat dissipation components can be controlled by circuitry located on or within the memory device to provide fluid flow to the memory device to, for example, maintain the temperature of the memory device such that it falls within the above-described operating temperature range of the memory device. For example, in some approaches, circuitry located on or within the memory device can receive information from the thermal sensors provided to the memory device and, based on the information received from the sensors, control the heat dissipation components to provide fluid flow to the memory device.

In some approaches, the memory device can include internal registers in which temperature information corresponding to the memory device can be stored. In approaches that utilize internal registers to store the temperature information, circuitry located on or within the memory device can access the temperature information from the internal registers and control the heat dissipation components to provide fluid flow to the memory device based on the information accessed from the internal registers.

In some approaches, in addition to regulation of fluid flow on or within the memory device, using, for example, heat dissipation components, power consumption of the memory device can be regulated by, for example, circuitry located on or within the memory device. For example, in response to a determination that the memory device is operating at a temperature that is above a threshold temperature, the circuitry located on or within the memory device can cause an amount of power provided to (or consumed by) the memory device to be reduced (e.g., throttled). Since the amount of electrical power supplied to the memory device can affect the temperature of the memory device, by causing the amount of power provided to the memory device to be reduced, a corresponding reduction in the power provided to the memory device can give rise to a corresponding decrease in the temperature of the memory device.

However, because the amount of power supplied to the memory device can be indicative of the workload of the memory device (e.g., larger workloads and/or faster processing of workloads by the memory device can imply a larger consumption of power by the memory device), reducing the amount of power provided to the memory device can reduce the efficacy of the memory device in processing workloads assigned thereto. Accordingly, reducing power provided to the memory device can come at the cost of reduced performance of the memory device, which may be non-ideal.

Although the above-described methodologies can, in some approaches, allow for the temperature of a memory device to be controlled, the circuitry to control the heat dissipation components can take up physical space on the memory device that could be used for other purposes. For example, in embodiments described herein in which the circuitry to determine the temperature of the memory device and/or the package of the memory device and/or circuitry to control operation of the heat dissipation components is located on a host coupled to the memory device, the physical space on the memory device that is taken up by such circuitry in some approaches can be used for other components and/or circuitry such as additional storage space, circuitry to perform error correction operations, circuitry to control operations on data stored in the memory device, etc. That is, in some embodiments, by performing thermal leveling operations using circuitry on a host as opposed to circuitry on the memory device, additional components and/or circuitry may be included on the memory device that may not be included on the memory device in approaches in which thermal leveling operations are performed using circuitry on or within the memory device.

Accordingly, embodiments herein are directed to performance of thermal leveling operations to control the thermal characteristics of a memory device using circuitry external to the memory device. For example, in some embodiments, thermal leveling operations can be performed by a host (e.g., a host computing device) coupled to the memory device. The host can include specialized circuitry (e.g., hardware, logic, integrated circuits, etc.) in the form of a thermal leveling component to perform thermal leveling operations based on information received from the memory device.

Some embodiments are directed to thermal leveling in large-scale computing environments such as data centers, server farms, supercomputers, mainframe computers, rack computing systems, blade servers, or other computing systems that include multiple memory devices that are controlled by one or more hosts. In some approaches thermal leveling operations are controlled by each memory device in the large-scale computing environment, which may lead to non-ideal outcomes. For example, in approaches in which each memory device in a large-scale computing environment controls only its own thermal characteristics and/or behavior, overall performance of the computing system may suffer because the thermal behavior of one memory device may affect the thermal characteristics and/or behavior of other memory devices in the large-scale computing environment.

As an example, if one memory device is operating at a relatively high temperature (e.g., at the high end or above the operating temperature range for that memory device), the memory device may cause neighboring memory devices (e.g., memory devices located physically nearby) to heat up as well. These neighboring memory devices may then detect the temperature increase and control their thermal dissipation circuitry to reduce their own temperature, which can reduce their efficacy.

For example, due to workload imbalances between the memory devices in large-scale computing environments, one memory device may be consuming a greater amount of power than a neighboring memory device. This consumption of power may lead to an increase in the temperature of the memory device, which can lead to a corresponding temperature increase in the neighboring memory device. The neighboring memory device can then, in some approaches, cause its temperature to be reduced, for example, by operation of heat dissipation components located on or within the neighboring memory device and/or through power throttling, which can reduce the performance of the neighboring memory device despite the fact that the neighboring memory device was handling a lighter workload than the memory device that initially heated up due to its own, higher workload.

In contrast, by performing thermal leveling operations using a host (e.g., a host computing device) coupled to the memory devices, as described herein, workloads may be balanced across the memory devices in a large-scale computing environment to mitigate or eliminate the above shortcomings exhibited by some approaches. For example, in some embodiments, the host can include specialized circuitry (e.g., hardware, logic, integrated circuits, etc.) in the form of a thermal leveling component that can perform thermal leveling operations on the memory devices in a large-scale computing environment by monitoring workloads, temperatures, and/or power consumption of the memory devices and assigning workloads to the memory devices based on the monitored workloads across all the memory devices, as well as the temperatures and/or power consumption of the memory devices.

This can lead to an improvement in the function of the overall computing system because the thermal leveling component can balance workloads across the memory devices in a manner that reduces thermal interference between memory devices, which can lead to fewer memory devices self-throttling and effectively reducing their performance in response to thermal interference from other neighboring memory devices. In addition, embodiments described herein can cause workloads to be assigned to the memory devices such that the memory devices function within a safe operating temperature range, which can reduce memory device damage and/or failure.

Further, by controlling thermal leveling operations using a host-based thermal leveling component, wear leveling operation can be centrally performed for multiple memory devices in a large-scale computing environment. For example, in contrast to approaches in which each memory device in a large-scale computing environment is responsible for its own wear leveling, the thermal leveling component can, in some embodiments, monitor workloads across the memory devices and assign workloads to the memory devices to perform wear leveling operations on multiple memory devices. This can allow for improved longevity of the memory devices in comparison to approaches in which each memory device handles its own wear leveling operations.

In addition, because the host can, in some embodiments, include more powerful processing resources than the memory device, thermal leveling operations can be performed on the host faster and/or more thoroughly than in approaches in which the thermal behavior is regulated on the memory device. This can improve performance of a computing system in comparison to approaches in which the thermal leveling is performed on the memory device by allowing for improved throughput of data, reduced incidental power throttling, and improved wear leveling across multiple memory devices that may not be possible due to the limited resources available to the memory device and/or the limited visibility between memory devices characteristic of some of the approaches described above.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "A," "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 106 may reference element "06" in FIG. 1, and a similar element may be referenced as 206 in FIG. 2. A group or plurality of similar elements or components may generally be referred to herein with a single element number. For example, a plurality of reference elements 112-1, 112-2, . . . , 112-N (e.g., 112-1 to 112-N) may be referred to generally as 112. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example.

The memory system 104 can be a solid-state drive (SSD), for instance, and can include a host interface 108, a controller 110, e.g., a processor and/or other control circuitry, and a number of memory devices 112-1 to 112-N, e.g., solid state memory devices such as NAND flash devices, which provide a storage volume for the memory system 104. In a number of embodiments, the controller 110, a memory device 112-1 to 112-N, and/or the host interface 108 can be physically located on a single die or within a single package, e.g., a managed NAND application. Also, in a number of embodiments, a memory, e.g., memory devices 112-1 to 112-N, can include a single memory device or a plurality of memory devices as shown in FIG. 1.

The computing system 100 can include separate integrated circuits or the host 102, the memory system 104, the thermal leveling component 106, the host interface 108, the controller 110, and/or the memory devices 112-1 to 112-N can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

As illustrated in FIG. 1, the controller 110 can be coupled to the host interface 108 and to the memory devices 112-1 to 112-N via one or more channels and can be used to transfer data between the memory system 104 and a host 102. The host interface 108 can be in the form of a standardized interface. For example, when the memory system 104 is used for data storage in a computing system 100, the host interface 108 can be a serial advanced technology attachment (SATA), peripheral component interconnect express (PCIe), or a universal serial bus (USB), a double data rate (DDR) interface, among other connectors and interfaces. In general, however, interface 108 can provide an interface for passing control, address, data, and other signals between the memory system 104 and a host 102 having compatible receptors for the host interface 108.

The host 102 can be a host system such as a personal laptop computer, a desktop computer, a digital camera, a mobile telephone, an internet-of-things (IoT) enabled device, a memory card reader, or graphics processing unit (e.g., a video card), among various other types of hosts. The host 102 can include a system motherboard and/or backplane and can include a number of memory access devices, e.g., a number of processing resources (e.g., one or more processors, microprocessors, or some other type of controlling circuitry). One of ordinary skill in the art will appreciate that "a processor" can intend one or more processors, such as a parallel processing system, a number of coprocessors, etc. The host 102 can be coupled to the host interface 108 of the memory system 104 by a communication channel 103.

In some embodiments, the host 102 can be responsible for executing an operating system for a computing system 100 that includes the memory system 104. Accordingly, in some embodiments, the host 102 can be responsible for controlling operation of the memory system 102. For example, the host 102 can execute instructions (e.g., in the form of an operating system) that manage the hardware of the computing system 100 such as scheduling tasks, executing applications, controlling peripherals, etc.

In some approaches, the memory system 104 (e.g., the controller 110 and/or the memory devices 112-1 to 112-N), can include circuitry configured to determine thermal characteristics of the memory system 104 (e.g., thermal characteristics of the memory devices 112-1 to 112-N) and/or cause an action to be taken to control the thermal characteristics of the memory system 104. As used herein, "thermal characteristics" of the memory system 104 include characteristics and/or properties of the memory system 104 that affect a thermal state of the memory system 104. For example, power consumption of the memory system 104 can be considered a thermal characteristic of the memory system 104 because, in general, as an amount of power provided to, or consumed by, the memory system 104 in operation increases, a temperature of the memory system 104 can increase as well.

Workload deployment (e.g., a quantity of workloads assigned) to memory devices 112 of a memory system 104 can also be considered a thermal characteristic of the memory system 104 because as the quantity of workloads assigned to the memory device(s) 112 increases, the temperature of the memory device(s) 112 can also increase. Other non-limiting examples of thermal characteristics of a memory system 104 and/or memory devices 112 can include temperature changes that occur as a result of electrical current supplied to the memory system 104 and/or memory devices 112 during operation, temperature changes that can occur as a result of the rate at which data is transferred to or from the memory system 104 (e.g., the faster data is transferred to and from the memory system the higher the temperature of the memory system), temperature changes that can occur as a result of a rate at which the memory system 104 performs memory operations on data stored thereby (e.g., the faster that memory operations are performed the higher the temperature of the memory system), etc.

As shown in FIG. 1, the host 102 can include a thermal leveling component 106, which can monitor thermal characteristics of the memory system 104 and/or cause an action to be taken to control the thermal state or thermal behavior of the memory system 104. That is, in contrast to approaches in which thermal leveling operations are performed by circuitry resident on the memory system 104, as shown in FIG. 1, the thermal leveling component 106, which can responsible for performing thermal leveling operations, is resident on the host 102. As used herein, the term "resident on" refers to something that is physically located on a particular component. For example, the thermal leveling component 106 being "resident on" the host 102 refers to a condition in which the error correction component is physically coupled to the host. The term "resident on" may be used interchangeably with other terms such as "deployed on" or "located on," herein.

For example, as described in more detail, herein, the thermal leveling component 106 can perform (or cause performance of) thermal leveling operations, which can include operations to control thermal characteristics (e.g., workload deployment, power consumption, temperature, etc.) of the memory system 104. As used herein, "thermal leveling operations" refer to operations performed to control or alter the thermal characteristics or thermal behavior of the memory system 104. Examples of thermal leveling operations can include operations to control thermal dissipation components to alter an amount of fluid flow provided to the memory system 104, operations to assign, re-assign, or balance workload allocation to a memory system 104, and/or operations to control an amount of power provided to, or consumed by, the memory system 104, among other operations.

The thermal leveling component 106 can include hardware and/or firmware to perform operations and/or tasks associated with thermal leveling, such as monitoring thermal characteristics of the memory system 104 and/or performing thermal leveling operations of the memory system 104. For example, the thermal leveling component 106 can include a number of components in the form of hardware and/or firmware, e.g., one or more integrated circuits, and/or software for monitoring and/or controlling the thermal behavior of the memory system 104 (e.g., the memory devices 112). In some embodiments, the thermal leveling component 106 can include or can be provisioned with a processing device or set of processors, such as a computer processor or a number of co-processors. The thermal leveling component 106 can include one or more sub-components, such as the workload thermal impact score component 314 illustrated and described in connection with FIG. 3, herein.

The thermal leveling component 106 can receive information corresponding to the thermal characteristics of the memory system 104 via, for example, the host interface 108. The information can be detected and/or generated by the memory devices 112, for example, using thermal characteristic sensors (e.g., the thermal characteristic sensors 213 illustrated in FIG. 2, herein) and/or the information can be detected and/or generated by the controller 110 of the memory system 104. In some embodiments, the information corresponding to the thermal characteristics can be stored in internal registers (e.g., the thermal characteristics registers 215 illustrated in FIG. 2, herein) of the memory devices 112 and read from the internal registers, as described in more detail in connection with FIG. 2.

In some embodiments, the thermal characteristics of the memory system 104 can include temperature information of the memory system 104 and/or the memory devices 112. The temperature information of the memory system 104 and/or the memory devices 112 can include die temperatures (e.g., temperatures of the circuits, arrays, or other components of the memory devices 112), package temperatures (e.g., a temperature of the overall memory system 104), a temperature of the controller 110, and/or a temperature of the host interface 108. It will be appreciated that temperature information of other components of the memory system 104 that are not shown so as to not obfuscate the components of FIG. 1 may be included in the temperature information of the memory system 104.

The temperature information of the memory system 104 can include instantaneous temperature information (e.g., temperature information that is measured at a particular point in time), averaged temperature information (e.g., temperature information collected by the memory system 104 over time), delta temperature information (e.g., temperature information corresponding to a change in a temperature detected by the memory system 104 over a given period of time). The thermal leveling component 106 can use the received temperature information to perform thermal leveling operations on the memory system 104 and/or the memory devices 112.

In a non-limiting example, the thermal leveling component 106 can receive thermal characteristics in the form of instantaneous temperature information from the memory system 104 (e.g., form the memory device 112) and perform a thermal leveling operation for the memory device 112 based on the received temperature information. Performing the thermal leveling operation for the memory device 112 can, for example, include controlling operation of a heat dissipation component (e.g., a fan) deployed in the memory system 104. Embodiments are not so limited, however, and in some embodiments, performing the thermal leveling operation for the memory device 112 can include managing assignment of workloads assigned to the memory device 112 and/or altering workload assignment to the memory device 112 based on the received temperature information.

In an example in which the thermal leveling component 106 can control a heat dissipation component (e.g., the heat dissipation component 217 illustrated in FIG. 2, herein) deployed in the memory system 104, the thermal leveling component 106 can determine, based on the received thermal characteristics (e.g., the received temperature information), that the memory device 112 is approaching (or has reached) a temperature that is near to, or above, a temperature at which the memory device 112 may be susceptible to damage and/or failure. In response to this determination, the thermal leveling component 106 can control the heat dissipation component to provide a level of heat dissipation commensurate with the received thermal characteristics.

For example, if the heat dissipation component is a fan, the thermal leveling component 106 can enable the fan or cause the fan to increase its speed to operate at a higher quantity of revolutions per minute in response to the received thermal characteristics to provide a higher amount of fluid flow (and therefore a higher amount of cooling) to the memory device 112. If it is determined by the thermal leveling component 106 that the thermal characteristics of the memory device 112 subsequently change (e.g., that the temperature received from the memory device 112) lowers, the thermal characteristic component 106 can disable the fan or cause the fan to decrease its speed to operate at a lower quantity of revolutions per minute in response to the subsequently received thermal characteristics.

In another non-limiting example, the thermal leveling component 106 can periodically (or sporadically) receive temperature information from the memory system 104 and analyze the received temperature information to determine recurring temperature characteristics and/or patterns in the temperature information. The thermal leveling component 106 can use such patterns to learn and/or predict future thermal behavior of the memory system 104 and/or the memory devices 112 to preemptively perform thermal leveling operations on the memory system 104 and/or memory devices 112.

For example, the thermal leveling component 106 can receive temperature information corresponding to each memory device 112-1 to 112-N in the memory system 104 over a period of time (e.g., the thermal leveling component 106 can receive multiple instantaneous temperature readings from each memory device 112 over a period of time) and analyze the temperature information to determine patterns in the temperature behavior of the memory devices 112. The patterns can, in some embodiments, correspond to changes in temperature exhibited by the memory devices 112 in response to initiation of certain kinds of workloads, changes in temperature exhibited by the memory devices 112 in response to changes in the power consumption of the memory devices 112, changes in temperature exhibited by the memory devices 112 in response to a quantity of workloads assigned to the memory devices 112, or other changes in temperature exhibited by the memory devices 112 in response to various events.

Once the thermal leveling component 106 has determined one or more patterns in the temperature information, the thermal leveling component 106 can perform a thermal leveling operation on the memory system 104 and/or the memory devices 112 based on the pattern(s). For example, if the thermal leveling component 106 determines that one of the memory devices 112 is initiating a certain kind of workload that is indicative of a temperature change in the memory device(s) 112, the thermal leveling component can perform the thermal leveling operation on the memory device 112 that is initiating that workload to preemptively control the thermal characteristics of that memory device 112.

Embodiments are not so limited, however, and in some embodiments, the thermal leveling component 112 can perform the thermal leveling operation at a point in time later than initiation of the workload that is indicative of the temperature change to the memory device 112 to, for example, allow the memory device 112 to execute at least a portion of the workload before the thermal leveling component 106 performs the thermal leveling operation. By performing the thermal leveling operation at a point in time later than initiation of the workload that is indicative of the temperature change to the memory device 112, the memory device 112 may be allowed to operate at a high level of performance for a certain period of time before the thermal leveling operation is performed by the thermal leveling component 106, thereby optimizing execution of the workload on the memory device 112 while controlling the thermal characteristics of the memory device 112 to keep the thermal characteristics of the memory device 112 within an operating range at which the memory device 112 should not incur damage and/or failure from thermal effects.

In another non-limiting example, the thermal leveling component 106 can receive information corresponding to the thermal characteristics of the memory system 104 in the form of power consumption information corresponding to the memory system 104. The power consumption information of the memory system 104 can include instantaneous power consumption information (e.g., power consumption information that is measured at a particular point in time), averaged power consumption information (e.g., power consumption information collected by the memory system 104 over time), delta power consumption information (e.g., temperature information corresponding to a change in a power consumption detected by the memory system 104 over a given period of time). The thermal leveling component 106 can use the received power consumption information to perform thermal leveling operations on the memory system 104 and/or the memory devices 112.

Similar to the examples above, the thermal leveling component 106 can perform a thermal leveling operation for the memory device 112 based on the received power consumption information. Performing the thermal leveling operation for the memory device 112 can, for example, include controlling operation of a heat dissipation component (e.g., a fan) deployed in the memory system 104. Embodiments are not so limited, however, and in some embodiments, performing the thermal leveling operation for the memory device 112 can include managing assignment of workloads assigned to the memory device 112 and/or altering workload assignment to the memory device 112 based on the received power consumption information.

As described in more detail in connection with FIG. 3, herein, the thermal leveling component 106 can also, in some embodiments, control wear leveling operations for the memory system 104. For example, the thermal leveling component 106 can track which sectors of the memory system 104 (e.g., sectors of the memory device 112-1 to 112-N) and/or which memory devices 112-1 to 112-N incur data writes and/or data reads during operation of the memory system 104. The thermal leveling component 106 can communicate with the memory system 104 using this information and/or information corresponding to the thermal characteristics of the memory system 104 to instruct the memory system 104 to write data to, or read data from, particular memory devices 112-1 to 112-N and/or particular sectors of the memory devices 112-1 to 112-N to provide wear leveling to the memory system 104.

As described in more detail in connection with FIG. 3, herein, the thermal leveling component 106 can control workload distribution among the memory devices 112-1 to 112-N and/or can control workload distribution among sectors of the memory devices 112-1 to 112-N based on frequency of read/writes and/or the thermal characteristics of the memory system 104 and/or memory devices 112. By performing wear leveling operations using the thermal leveling component 106, circuitry present on the memory system 104 that is used to perform wear leveling operations in some approaches may be reduced or eliminated, which can free up additional space on the memory system 104 for other purposes, such as additional storage or other circuitry to provide other functionality to the memory system 104.

Further, by performing thermal leveling operations using the thermal leveling component 106 resident on the host 102, a greater amount of processing resources may be available for use in performing thermal leveling operations than in approaches in which thermal leveling operations are performed on the memory system 104. For example, due to space constraints typically associated with a memory system, such as the memory system 104, hardware resources on or within the memory system 104 may be more limited than hardware resources available to a host computing system such as the host 102. Ss a result, in some approaches, the constrained hardware resources available to the memory system 104 can lead to trade-offs between speed, power consumption, and/or accuracy, among other factors, when performing thermal leveling operations for the memory system 104.

In contrast, by performing thermal leveling operations on the host 102 using the thermal leveling component 106 described herein, increased hardware resources can be available for performing thermal leveling operations, which can mitigate or, in some embodiments, eliminate, the trade-offs characteristic of approaches in which thermal leveling operations are performed on the memory system 104, which can lead to improved thermal performance of the memory system 104 and/or improved wear leveling of the memory system 104. That is, by performing thermal leveling operations on the host 102 using the thermal leveling component 106, as described herein, more hardware resources can be made available for performing thermal leveling operations than can be made available when performing thermal leveling operations on the memory system 104, which can increase the efficacy of thermal leveling operations for the memory system 104, provide a higher level of accuracy for thermal leveling operation, and/or improve performance of the memory system 104 by improving wear leveling and optimizing thermal performance of the memory system 104 in comparison to approaches in which the thermal leveling operations are performed on the memory system 104.

The controller 110 can communicate with the memory devices 112-1 to 112-N to control data read, write, erase operations, and/or error correction operations, among other operations. The controller 110 can include, for example, a number of components in the form of hardware and/or firmware, e.g., one or more integrated circuits, such as application-specific integrated circuit(s) (ASIC(s)), field-programmable gate array(s) (FPGA(s)), and/or software for controlling access to the number of memory devices 112-1 to 112-N and/or for facilitating data transfer between the host 102 and memory devices 112-1 to 112-N. The controller 110 can include various components not illustrated so as not to obscure embodiments of the present disclosure to control data read, write, erase, etc. operations. Such components may not be components of controller 110 in some embodiments, e.g., the components to control data read, write, erase, etc. operations can be independent components located within the memory system 104.

The memory devices 112-1 to 112-N can include a number of arrays of memory cells. The arrays can be flash arrays with a NAND architecture, for example. However, embodiments are not limited to a particular type of memory array or array architecture. The memory cells can be grouped, for instance, into sectors, e.g., a number of blocks including a number of physical pages. A number of blocks can be included in a plane of memory cells and an array can include a number of planes.

The memory devices 112-1 to 112-N can include volatile memory and/or non-volatile memory. The memory devices 112-1 to 112-N can provide main memory for the computing system 100 or can be used as additional memory or storage throughout the computing system 100. Each memory device 112-1 to 112-N can include one or more arrays of memory cells, e.g., volatile and/or non-volatile memory cells. The arrays can be flash arrays with a NAND architecture, for example. In a number of embodiments, memory devices 112-1 to 112-N can include a multi-chip device. A multi-chip device can include a number of different memory types and/or memory modules. For example, a memory system can include non-volatile or volatile memory on any type of a module. In embodiments in which the memory devices 112-1 to 112-N include non-volatile memory, the memory devices 112-1 to 112-N can be flash memory devices such as NAND or NOR flash memory devices. Embodiments are not so limited, however, and the memory devices 112-1 to 112-N can include other non-volatile memory devices such as non-volatile random-access memory devices (e.g., RAM, ROM, DRAM, SDRAM, PCRAM, RRAM, NVRAM, ReRAM, FeRAM, MRAM, PCM), "emerging" memory devices such as 3-D Crosspoint (3D XP) memory devices, etc., or combinations thereof. Embodiments are not limited to a particular type of memory device, however.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory devices 112-1 to 112-N. It will be appreciated by those skilled in the art that the number of address input connections can depend on the density and architecture of the memory devices 112-1 to 112-N.

Figure 2:
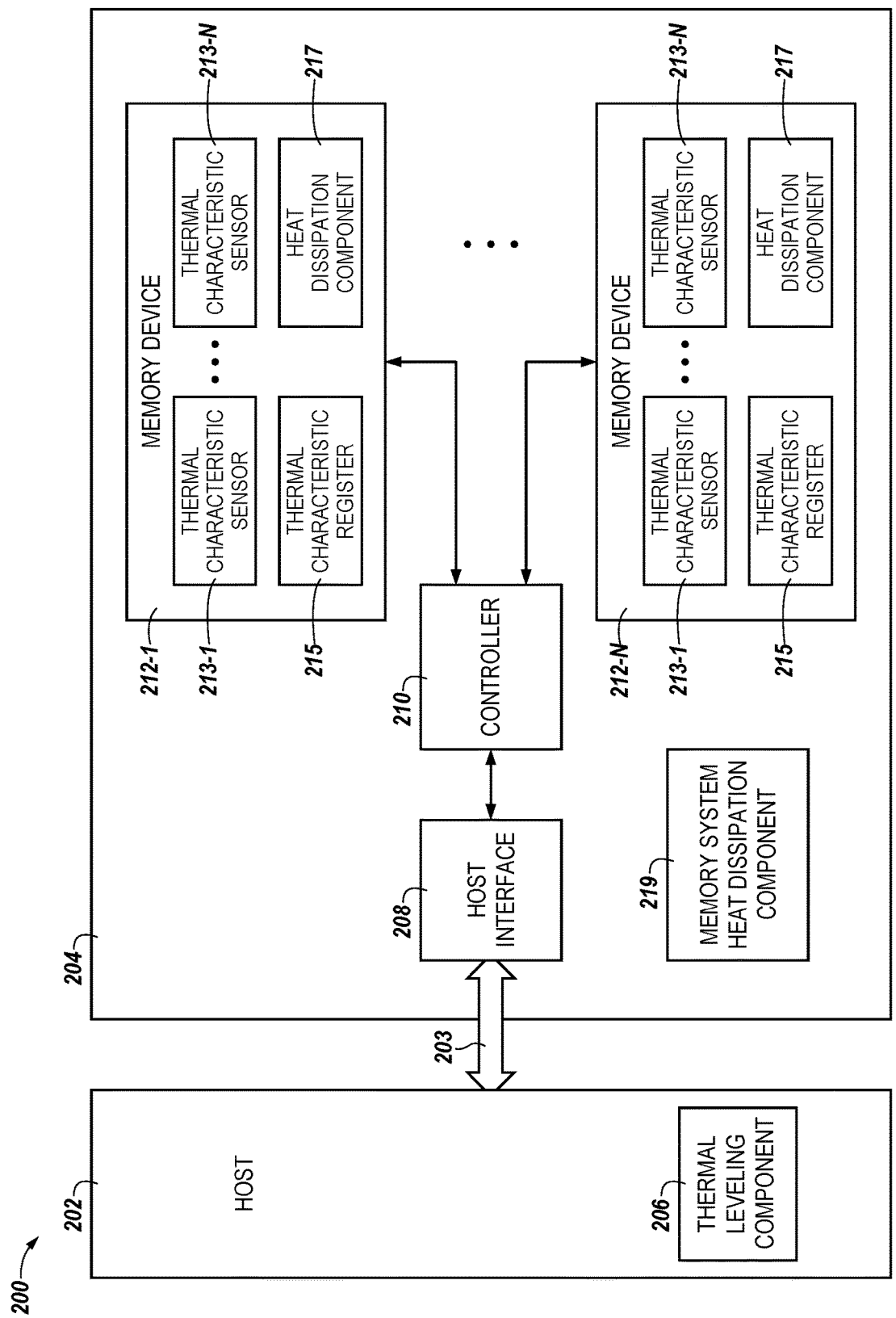
FIG. 2 is another functional block diagram in the form of a computing system including an apparatus including a memory system in accordance with a number of embodiments of the present disclosure.

FIG. 2 is another functional block diagram in the form of a computing system 200 including an apparatus including a memory system 204 in accordance with a number of embodiments of the present disclosure. As shown in FIG. 2 the computing system 200 can include a host 202, which can include a thermal leveling component 206. The computing system 200 can further include a memory system 204, which can include a host interface 208, a controller 210, a plurality of memory devices 212-1 to 212-N, and/or a memory system heat dissipation component 219. The memory system 204 can be coupled to the host 202 via a communication channel 203. The memory devices 212-1 to 212-N can include respective thermal characteristic sensors 213-1 to 213-N, a thermal characteristic register 215, and/or a heat dissipation component 217. In some embodiments, the host 202, the thermal leveling component 206, the memory system 204, the host interface 208, the controller 210, and/or the memory devices 212 can be analogous to the host 102, the thermal leveling component 106, the memory system 104, the host interface 108, the controller 110, and/or the memory devices 112 illustrated in FIG. 1.

The thermal characteristic sensors 213-1 to 213-N can sense and/or detect thermal characteristics, such as heat and/or power consumption, of the memory devices 212. For example, the thermal characteristic sensors 213 can determine a temperature at which the memory devices 212 are operating and/or the thermal characteristic sensors 213 can determine an amount of power consumed by and/or provided to the memory devices 212. The thermal characteristic sensors 213 can be physically located on the memory devices or coupled to an exterior portion of the memory devices 212 so long as they can sense and/or detect a temperature and/or power consumption of the memory devices 212.

In embodiments in which the thermal characteristic sensors 213 sense and/or detect temperature information, the temperature information can include instantaneous temperature information (e.g., temperature information that is measured at a particular point in time), averaged temperature information (e.g., temperature information collected by the memory system 204 and/or memory devices 212 over time), delta temperature information (e.g., temperature information corresponding to a change in a temperature detected by the memory system 204 and/or memory devices 212 over a given period of time). The thermal leveling component 206 can use the received temperature information to perform thermal leveling operations on the memory system 204 and/or the memory devices 212.

In embodiments in which the thermal characteristic sensors 213 sense and/or detect power consumption of the memory system 204 and/or the memory devices 212, the power consumption information can include instantaneous power consumption information (e.g., power consumption information that is measured at a particular point in time), averaged power consumption information (e.g., power consumption information collected by the memory system 204 and/or memory devices 212 over time), delta power consumption information (e.g., temperature information corresponding to a change in a power consumption detected by the memory system 204 and/or the memory devices 212 over a given period of time). The thermal leveling component 206 can use the received power consumption information to perform thermal leveling operations on the memory system 204 and/or the memory devices 212.

In some embodiments, the thermal characteristic sensors 213 can be configured to transfer the thermal characteristics detected therewith to a thermal characteristic register 215 and/or to the host 202 (e.g., to the thermal leveling component 206 resident on the host 202). The thermal leveling component 206 can receive the thermal characteristics from the thermal characteristic sensors 213 and perform thermal leveling operations for the memory system 204 and/or the memory devices 212, as described herein.

The thermal characteristic registers 215 can include one or more memory resources that are configured to store information. The information stored by the thermal characteristic registers 215 can include thermal characteristic information detected by the thermal characteristic sensors 213. In some embodiments, the thermal characteristic information detected by the thermal characteristic sensors 215 can be transferred to the thermal characteristic registers 215 for subsequent retrieval by the thermal leveling component 206 for use in performance of thermal leveling operations for the memory system 204 and/or the memory devices 212.

The thermal dissipation component 217 and/or the memory system heat dissipation component 219 can include one or more components that can function to provide fluid flow to the memory system 204 and/or the memory devices 212. In some embodiments, the thermal dissipation component 217 and/or the memory system thermal dissipation component 219 can include one or more fans, liquid cooling systems, or other components that provide fluid flow to the memory system 204 and/or the memory devices 212.

In some approaches, components that provide fluid flow to the memory system 204 and/or the memory devices 212, such as the thermal dissipation component 217 and/or the memory system heat dissipation component 219 illustrated in FIG. 2, can be controlled by circuitry resident on the memory system 204. For example, in approaches in which thermal leveling is provided by the memory system 204, the controller 210 and/or circuitry resident on the memory devices 212 can be responsible for controlling operation of the thermal dissipation component 217 and/or the memory system heat dissipation component 219 to provide cooling to the memory system 204 and/or the memory devices 212.

In contrast, in embodiments herein, the thermal leveling component 206 can be responsible for controlling (or at least partially controlling) operation of the thermal dissipation components 217 and/or the memory system heat dissipation component 219 to provide fluid flow to the memory system 204 and/or the memory devices 212. For example, the thermal leveling component 206 can control operation of the thermal dissipation component 217 and/or the memory system heat dissipation component 219 based on thermal characteristics received from the memory system 204 and/or the memory devices 212.

Figure 3:
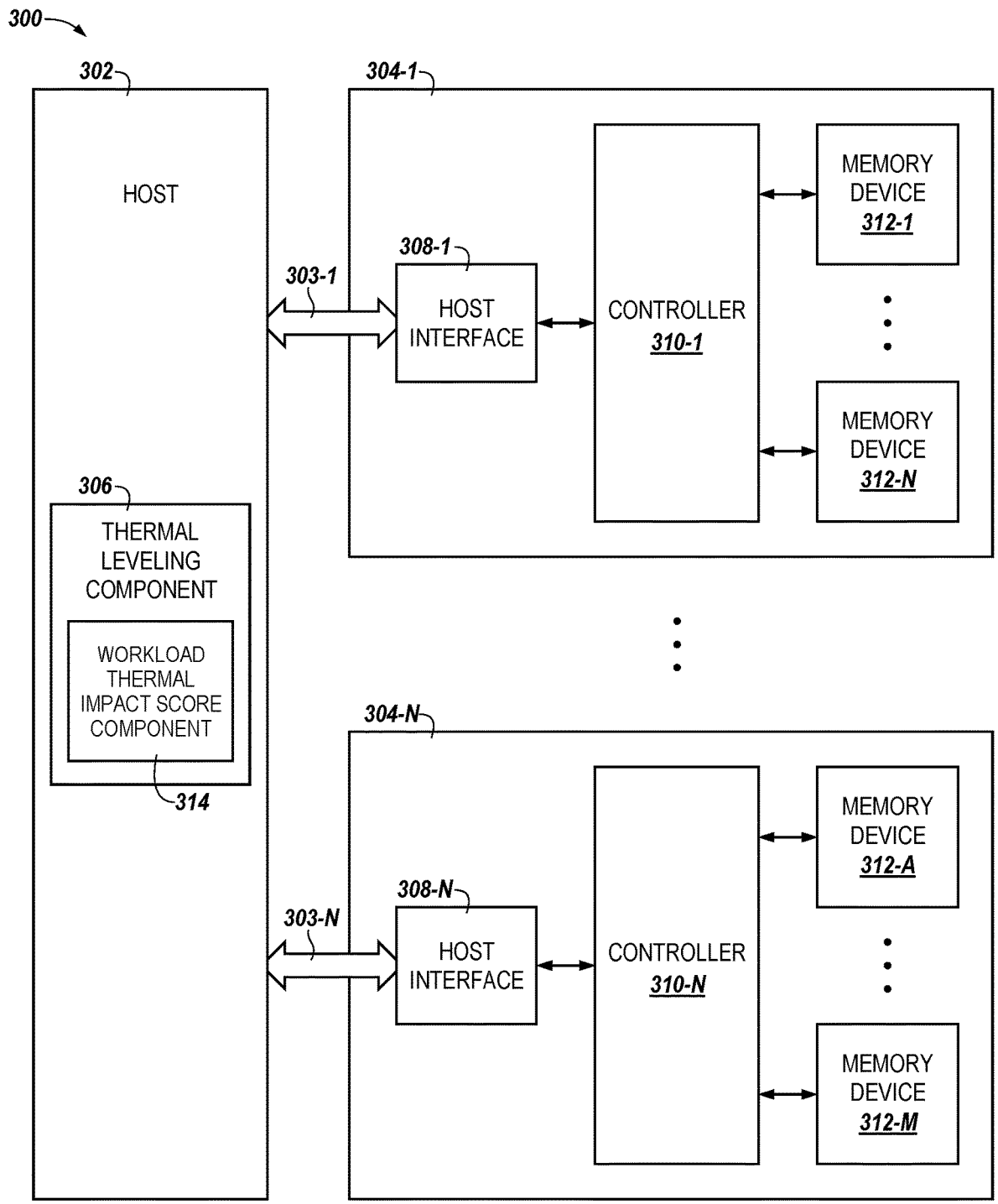
FIG. 3 is a functional block diagram in the form of a computing system including a thermal leveling component and a plurality of memory systems in accordance with a number of embodiments of the present disclosure.

FIG. 3 is a functional block diagram in the form of a computing system 300 including a thermal leveling component 306 and a plurality of memory systems 304 in accordance with a number of embodiments of the present disclosure. As shown in FIG. 3 the computing system 300 can include a host 302, which can include a thermal leveling component 306. The computing system 300 can further include a plurality of memory systems 304-1 to 304-N, which can include a respective host interface 308-1 to 308-N, a respective controller 310-1 to 310-N, and/or a respective plurality of memory devices 312-1 to 312-N and/or 312-A to 312-M. The memory systems 304-1 to 304-N can be coupled to the host 302 via respective communication channels 303-1 to 303-N. In some embodiments, the host 302, the thermal leveling component 306, the memory systems 304-1 to 304-N, the host interfaces 308-1 to 308-N, the controllers 310-1 to 310-N, and/or the memory devices 312-1 to 312-N and 312-A to 312-M can be analogous to the host 102/202, the thermal leveling component 106/206, the memory system 104/204, the host interface 108/208, the controller 110/210, and/or the memory devices 112/212 illustrated in FIGS. 1 and 2, herein.

The thermal leveling component 306 can receive information corresponding to the thermal characteristics of the memory system 304-1 to 304-N and/or the memory devices 312-1 to 312-N of the memory system 304-1 and/or the memory devices 312-A to 312-M of the memory system 304-N, as described above. The thermal leveling component 306 can use the information corresponding to the thermal characteristics of the memory system 304-1 to 304-N and/or the memory devices 312-1 to 312-N of the memory system 304-1 and/or the memory devices 312-A to 312-M of the memory system 304-N to cause thermal leveling operation to be performed on the memory system 304-1 to 304-N and/or the memory devices 312-1 to 312-N of the memory system 304-1 and/or the memory devices 312-A to 312-M of the memory system 304-N.

In some embodiments, the thermal leveling component 306 can perform thermal leveling operations by assigning workloads to the memory devices 312-1 to 312-N and/or 312-A to 312-M based on the thermal characteristics of the memory system 304-1 to 304-N and/or the memory devices 312-1 to 312-N of the memory system 304-1 and/or the memory devices 312-A to 312-M of the memory system 304-N. For example, the thermal leveling component 306 can assess the workload distribution across the memory devices 312-1 to 312-N and 312-A to 312-M and can, based on the received thermal characteristics, perform thermal leveling operations on the memory system 304-1 to 304-N and/or the memory devices 312-1 to 312-N of the memory system 304-1 and/or the memory devices 312-A to 312-M of the memory system 304-N.

In a non-limiting example, the thermal leveling component 306 can determine that a particular memory device (e.g., the memory device 312-1) is executing a greater quantity of workloads than a different memory device (e.g., the memory device 312-N). The thermal leveling component 306 can analyze the thermal impact on the memory devices 312-1 and 312-N, in this example, to determine that the memory device 312-1 is experiencing a greater thermal impact (e.g., a higher power consumption, higher temperature, etc.) than the memory device 312-N. As used herein, the "thermal impact" on, for example, a memory device, refers to time-dependent thermal temperature of the memory device. For example, the thermal impact can include temperature, workload, and/or power consumption information for a memory device over time. The thermal impact on a memory device can include how long a memory device has been operating (or is expected to operate) at a particular operating temperature, which can affect the performance of the memory device.

Based on this determination, the thermal leveling component 306 can re-assign one or more workloads from the memory device 312-1 to the memory device 312-N and/or the thermal leveling component 306 can assign subsequent workloads to the memory device 312-N instead of assigning subsequent workloads to the memory device 312-1. In some embodiments, performing thermal leveling operations in this manner can reduce a quantity of workloads executed by the memory device 312-1 while increasing a quantity of workloads executed by the memory device 312-N, which can reduce the thermal impact to the memory device 312-1 while increasing the thermal impact to the memory device 312-N, thereby leveling the thermal impact to the memory system 304-1.

In another non-limiting example, the thermal leveling component 306 can determine that a particular memory device (e.g., the memory device 312-1) of the memory system 304-1 is executing a greater quantity of workloads than a memory device (e.g., the memory device 312-A) of the memory system 304-N. The thermal leveling component 306 can analyze the thermal impact on the memory devices 312-1 and 312-A, in this example, to determine that the memory device 312-1 is experiencing a greater thermal impact (e.g., a higher power consumption, higher temperature, etc.) than the memory device 312-A.

Based on this determination, the thermal leveling component 306 can re-assign one or more workloads from the memory device 312-1 to the memory device 312-A and/or the thermal leveling component 306 can assign subsequent workloads to the memory device 312-A instead of assigning subsequent workloads to the memory device 312-1. In some embodiments, performing thermal leveling operations in this manner can reduce a quantity of workloads executed by the memory device 312-1 while increasing a quantity of workloads executed by the memory device 312-A, which can reduce the thermal impact to the memory system 304-1 while increasing the thermal impact to the memory system 304-N, thereby leveling the thermal impact across the memory systems 304-1 to 304-N.

In some embodiments, the thermal leveling component 306 can include a workload thermal impact score component 314 that can be configured to assign workload thermal impact scores to workloads executed by the memory systems 304-1 to 304-N and/or the memory devices 312-1 to 312-N and/or 312-A to 312-M. The workload thermal impact score component 314 can include hardware and/or firmware to perform operations and/or tasks associated with scoring and/or ranking a thermal impact incurred by the memory systems 304-1 to 304-N and/or the memory devices 312-1 to 312-N and/or 312-A to 312-M. In some embodiments, the thermal leveling component 306 can include a computer processor or a set of processors, or can be provisioned with computer processing resources. For example, the workload thermal impact score component 314 can include a number of components in the form of hardware and/or firmware, e.g., one or more integrated circuits, and/or software for scoring and/or ranking a thermal impact incurred by the memory systems 304-1 to 304-N and/or the memory devices 312-1 to 312-N and/or 312-A to 312-M.

In some embodiments, the workload thermal impact score component 314 can assign scores and/or ratings to types of workloads running on the memory devices 312-1 to 312-N and/or 312-A to 312-M. As an example, the workload thermal impact score component 314 can assign scores on a 0-10 scale where 0 indicates a workload that has a low thermal impact on the memory systems 304-1 to 304-N and/or the memory devices 312-1 to 312-N and/or 312-A to 312-M and 10 indicates a workload that has a high thermal impact on the memory systems 304-1 to 304-N and/or the memory devices 312-1 to 312-N and/or 312-A to 312-M. Embodiments are not limited to this particular scoring system, however, and the workload thermal impact score component 314 can assign scores and/or ratings to the workloads running on the memory systems 304-1 to 304-N and/or the memory devices 312-1 to 312-N and/or 312-A to 312-M using other scoring systems so long as the scores can be ranked based on the thermal impact a workload incurs to the memory systems 304-1 to 304-N and/or the memory devices 312-1 to 312-N and/or 312-A to 312-M.

The workload thermal impact score component 314 can assign scores to workloads that are substantially similar in scope. For example, the workload thermal impact score component 314 can analyze the workloads running on the memory systems 304-1 to 304-N and/or the memory devices 312-1 to 312-N and/or 312-A to 312-M and determine that some workloads have a same or similar scope to other workloads running on the memory systems 304-1 to 304-N and/or the memory devices 312-1 to 312-N and/or 312-A to 312-M. The workload thermal impact score component 314 can assign a same (or similar) score to these workloads to reflect that these workloads are of a same (or similar) scope. For example, because workloads that are a same (or similar) scope can cause a same (or similar) change in the thermal characteristics of the memory systems 304-1 to 304-N and/or the memory devices 312-1 to 312-N and/or 312-A to 312-M when executed, the scores assigned thereto by the workload thermal impact score component 314 can be the same (or similar).

This can allow the thermal leveling component 306 to determine that a workload to be subsequently executed by the memory systems 304-1 to 304-N and/or the memory devices 312-1 to 312-N and/or 312-A to 312-M that is the same (or similar) in scope to previously executed workloads may incur similar thermal characteristics by the memory systems 304-1 to 304-N and/or the memory devices 312-1 to 312-N and/or 312-A to 312-M when executed. Based on this determination, the thermal leveling component 306 can assign the subsequently executed workload that has a same (or similar) scope to a workload that has been scored by the workload thermal impact score component 314 to one of the memory systems 304-1 to 304-N and/or the memory devices 312-1 to 312-N and/or 312-A to 312-M as part of performance of a thermal leveling operation.

As another example, the workload thermal impact score component 314 can assign scores and/or ratings to workloads running on the memory devices 312-1 to 312-N and/or 312-A to 312-M based on a change in the thermal characteristics exhibited by the memory systems 304-1 to 304-N and/or the memory devices 312-1 to 312-N and/or 312-A to 312-M as a result of running the workload(s). For example, the workload thermal impact score component 314 can, individually or in concert with the thermal leveling component 306, receive thermal characteristic information in the form of instantaneous temperature and/or power consumption information (e.g., temperature information and/or power consumption that is measured by the memory systems 304-1 to 304-N and/or the memory devices 312-1 to 312-N and/or 312-A to 312-M at a particular point in time), averaged temperature and/or power consumption information (e.g., temperature and/or power consumption information collected by the memory systems 304-1 to 304-N and/or the memory devices 312-1 to 312-N and/or 312-A to 312-M over time), delta temperature and/or power consumption information (e.g., temperature and/or power consumption information corresponding to a change in a temperature detected by the memory systems 304-1 to 304-N and/or the memory devices 312-1 to 312-N and/or 312-A to 312-M over a given period of time) that corresponds to workloads running on the memory systems 304-1 to 304-N and/or the memory devices 312-1 to 312-N and/or 312-A to 312-M and assign scores to the thermal characteristic information that corresponds to the workloads running on the memory systems 304-1 to 304-N and/or the memory devices 312-1 to 312-N and/or 312-A to 312-M.

In some embodiments, the thermal leveling component 306 can rank the memory systems 304-1 to 304-N and/or the memory devices 312-1 to 312-N and/or 312-A to 312-M based on the scores and/or ratings. For example, the thermal leveling component 306 can generate a ranked list of the memory systems 304-1 to 304-N and/or the memory devices 312-1 to 312-N and/or 312-A to 312-M based on the scores and/or ratings that indicates an order in which workloads can be assigned to the memory systems 304-1 to 304-N and/or the memory devices 312-1 to 312-N and/or 312-A to 312-M. The thermal leveling component 306 can then assign (or re-assign) workloads to the memory systems 304-1 to 304-N and/or the memory devices 312-1 to 312-N and/or 312-A to 312-M based on the ranked list of memory systems 304-1 to 304-N and/or the memory devices 312-1 to 312-N and/or 312-A to 312-M.

In some embodiments, the thermal leveling component 306 can then re-assign one or more workloads from one of the memory devices (e.g., from the memory device 312-1) to a different memory device (e.g., the memory device 312-N) and/or the thermal leveling component 306 can assign subsequent workloads to the memory device 312-N instead of assigning subsequent workloads to the memory device 312-1. Similarly, as described above, the thermal leveling component 306 can then re-assign one or more workloads from one a memory device (e.g., from the memory device 312-1) on one of the memory systems (e.g., the memory system 304-1) to a memory device (e.g., the memory device 312-A) that is on a different memory system (e.g., the memory system 304-N) and/or the thermal leveling component 306 can assign subsequent workloads to the memory device 312-A instead of assigning subsequent workloads to the memory device 312-1.

In contrast, in some approaches, assignment of workloads to memory devices (e.g., the memory devices 312-1 to 312-N) running on a single memory system (e.g., the memory system 304-1) and/or assignment of workloads to memory devices (e.g., the memory devices 312-1 to 312-N and/or 312-A to 312-M) across multiple memory system (e.g., the memory system 304-1 to 304-N) can be done arbitrarily, in a round-robin fashion, or some other methodology in which the thermal characteristics associated with the workloads running on the memory systems 304-1 to 304-N and/or the memory devices 312-1 to 312-N and/or 312-A to 312-M are not taken into account.

By assigning workloads to memory devices (e.g., the memory devices 312-1 to 312-N) running on a single memory system (e.g., the memory system 304-1) and/or assigning workloads to memory devices (e.g., the memory devices 312-1 to 312-N and/or 312-A to 312-M) across multiple memory system (e.g., the memory system 304-1 to 304-N) based on the thermal characteristics of the memory systems 304-1 to 304-N and/or the memory devices 312-1 to 312-N and/or 312-A to 312-M, as described herein, improved computing system 300 performance can be realized because the overall thermal characteristics of the memory systems 304-1 to 304-N and/or the memory devices 312-1 to 312-N and/or 312-A to 312-M can be taken into account when assigning workloads to the memory systems 304-1 to 304-N and/or the memory devices 312-1 to 312-N and/or 312-A to 312-M, which can reduce thermal wear on the memory systems 304-1 to 304-N and/or the memory devices 312-1 to 312-N and/or 312-A to 312-M, provide improved wear leveling across the memory systems 304-1 to 304-N and/or the memory devices 312-1 to 312-N and/or 312-A to 312-M, and/or increase the longevity of the memory systems 304-1 to 304-N and/or the memory devices 312-1 to 312-N and/or 312-A to 312-M.

In some embodiments, the workload thermal impact score component 314 can be configured to assign workload thermal impact scores to the memory systems 304-1 to 304-N and/or the memory devices 312-1 to 312-N and/or 312-A to 312-M based on the thermal characteristics of the memory systems 304-1 to 304-N and/or the memory devices 312-1 to 312-N and/or 312-A to 312-M. For example, the workload thermal impact score component 314 can assign scores the memory systems 304-1 to 304-N and/or the memory devices 312-1 to 312-N and/or 312-A to 312-M based on the memory systems 304-1 to 304-N and/or the memory devices 312-1 to 312-N and/or 312-A to 312-M exhibiting temperatures within certain temperature ranges.

In a non-limiting example, the workload thermal impact score component 314 can assign a first workload thermal impact score to a memory system (e.g. the memory system 304-1) and/or a memory device (e.g., the memory device 312-1) based on a determination that the memory system 304-1 and/or the memory device 312-1 is operating between 41° and 50° Celsius. The workload thermal impact score component 314 can assign a second workload thermal impact score to a memory system (e.g. the memory system 304-N) and/or a memory device (e.g., the memory device 312-A) based on a determination that the memory system 304-N and/or the memory device 312-A is operating between 51° and 61° Celsius. Based on the scores, the workload thermal impact component 314 can cause subsequent workloads to be assigned to the memory system 304-1 and/or the memory device 312-1 because the scores assigned to the memory system 304-1 and/or the memory device 312-1 correspond to lower operating temperatures than the scores assigned to the memory system 304-N and/or the memory device 312-A. It will be appreciated that other temperatures and/or different temperature ranges besides those explicitly listed above can be used.

Figure 4:
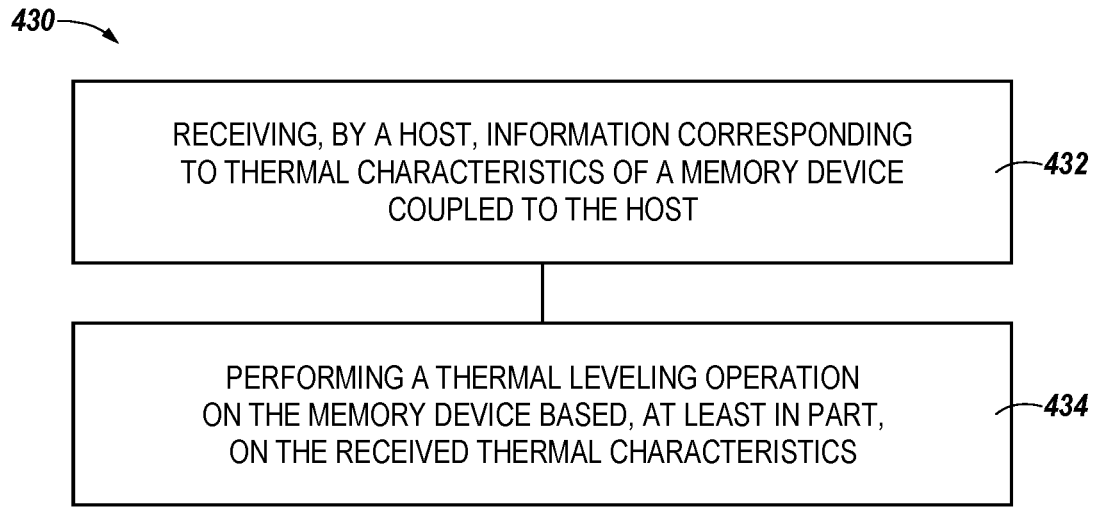
FIG. 4 is a flow diagram representing an example method for thermal leveling in accordance with a number of embodiments of the present disclosure.

FIG. 4 is a flow diagram representing an example method 430 for thermal leveling in accordance with a number of embodiments of the present disclosure. At block 432, the method 430 can include receiving, by a host, information corresponding to thermal characteristics of a memory device coupled to the host. For example, the method 430 can include receiving, by a thermal leveling component (TLC) resident on a host, information corresponding to thermal characteristics of a memory device coupled to the host. The TLC can be analogous to the TLC 106/206/306 illustrated in FIGS. 1-3, herein. Similarly, the host can be analogous to the host 102/202/302 and the memory device can be analogous to the memory device(s) 112/212/312 illustrated in FIGS. 1-3, herein. As described above, in some embodiments, the information corresponding to the thermal characteristics can include at least one of a temperature of the memory device and/or an amount of power consumption of the memory device. In some embodiments, receiving the information corresponding to thermal characteristics of the memory device can further include receiving information corresponding to thermal characteristics of each sector of the memory device.

At block 434, the method 430 can include performing a thermal leveling operation on the memory device based, at least in part, on the received thermal characteristics. For example, the TLC can cause a thermal leveling operation to be performed on the memory device based on the received thermal characteristics. In some embodiments, the thermal leveling operation can include controlling a thermal dissipation component associated with the memory device to provide fluid flow to the memory device and/or limiting an amount of power provided to or consumed by the memory device. Embodiments are not so limited, however, and in some embodiments, performing the thermal leveling operation can include managing assignment of workloads to the memory device based, at least in part, on the received thermal characteristics and/or controlling workload allocation to each sector of the memory device based, at least in part, on the received information corresponding to the thermal characteristics of each sector of the memory device.

The method 430 can further include monitoring workloads running on the memory device and/or assigning respective scores that are indicative of a thermal impact (e.g., workload thermal impact scores) to workloads running on the memory device based, at least in part, on a change in the thermal characteristics measured by the memory device corresponding to execution of the workloads. In some embodiments, the scores can be assigned by a workload thermal impact score component such as the workload thermal impact score component 314 illustrated in FIG. 3, herein.

As described in connection with FIG. 3, the method 430 can further include determining that a workload to be subsequently executed by the memory device is substantially similar in scope to a workload running on the memory device. In some embodiments, the method 430 can include assigning a score (e.g., a workload thermal impact score) to the workload to be subsequently executed by the memory device that is the same as the score assigned to the workload that is substantially similar in scope to the workload to be subsequently executed, executing the subsequently executed workload, and/or performing a second thermal leveling operation for the memory device in response to executing the subsequently executed workload.

In some embodiments, the method 430 can further include receiving information corresponding to thermal characteristics of each sector of the memory device and/or controlling workload allocation to each sector of the memory device based, at least in part, on the received information corresponding to the thermal characteristics of each sector of the memory device, as described herein.

Figure 5:
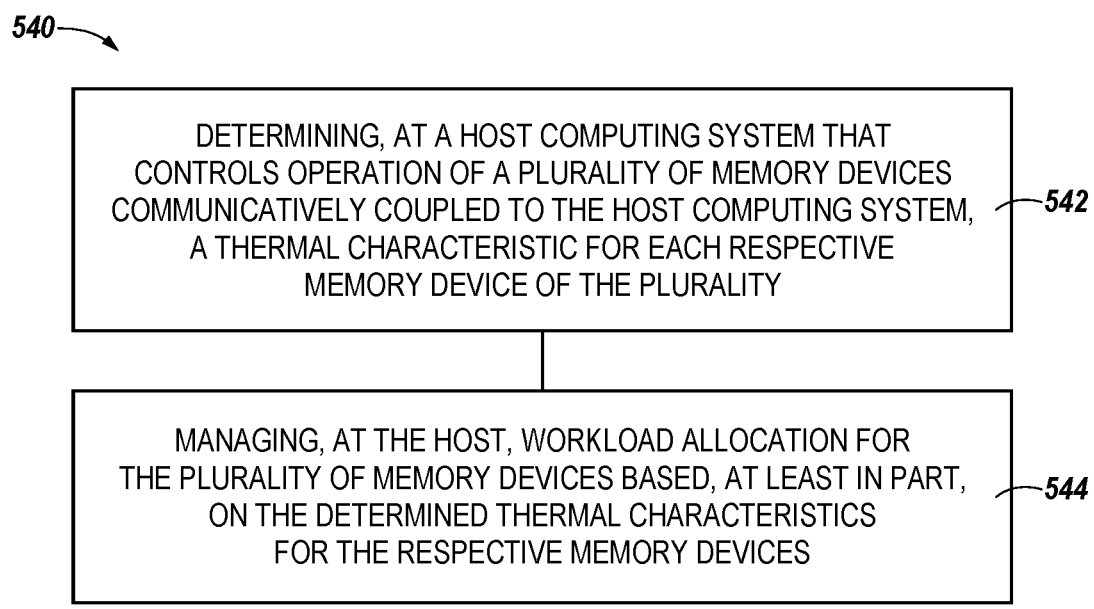
FIG. 5 is a flow diagram representing another example method for thermal leveling in accordance with a number of embodiments of the present disclosure.

FIG. 5 is a flow diagram representing another example method 540 for thermal leveling in accordance with a number of embodiments of the present disclosure. AT block 542, the method 540 can include determining, at a host computing system that controls operation of a plurality of memory devices communicatively coupled to the host computing system, a thermal characteristic for each respective memory device of the plurality. For example, the method 540 can include determining, using a thermal leveling component (TLC) resident on a host computing system that controls operation of memory devices in a large-scale computing environment, thermal characteristics for respective memory devices communicatively coupled to the host computing system. The TLC can be analogous to the TLC 106/206/306 illustrated in FIGS. 1-3, herein. Similarly, the host can be analogous to the host 102/202/302 and the memory device can be analogous to the memory device(s) 112/212/312 illustrated in FIGS. 1-3, herein. As described above, in some embodiments, the information corresponding to the thermal characteristics can include at least one of a temperature of the memory device(s) and/or an amount of power consumption of the memory device(s).

In some embodiments, determining the thermal characteristics for the respective memory devices can further include determining that a first memory device (e.g., a first memory device in the large-scale computing environment) is operating within a first temperature range and/or determining that a second memory device (e.g., a second memory device in the large-scale computing environment) is operating within a second temperature range. The first temperature range can comprise temperatures greater than temperatures of the second temperature range. Embodiments are not so limited, however, and in some embodiments, determining the thermal characteristics for the respective memory devices can further include determining that a first memory device is operating within a first power consumption range and/or determining that a second memory device is operating within a second power consumption range. The first power consumption range can comprise a power consumption greater than a power consumption corresponding to the second power consumption range. In some embodiments, the method 540 can further include allocating, using the host, a workload to the second memory device based, at least in part, on determining that the second memory device is operating within the second temperature range and/or allocating, using the host, a workload to the second memory device based, at least in part, on determining that the second memory device is operating within the second power consumption range.

At block 544, the method 540 can further include managing, at the host, workload allocation for the plurality of memory devices based, at least in part, on the determined thermal characteristics for the respective memory devices. For example, the method 540 can include managing, using the TLC, workload allocation for the memory devices based, at least in part, on the determined thermal characteristics for the respective memory devices. In some embodiments, managing workload allocation for the memory devices can include allocating, using the host (or TLC), a workload to the second memory device based, at least in part, on determining that the second memory device is operating within the second temperature range. In some embodiments, managing, using the host, workload allocation for the memory devices can be performed as part of a wear leveling operation performed on the memory devices by the host. Embodiments are not so limited, however, and in some embodiments, managing workload allocation for the memory devices can include allocating, using the host, a workload to the second memory device based, at least in part, on determining that the second memory device is operating within the second power consumption range.

The method 540 can, in some embodiments, include generating, using the host, scores indicative of a workload thermal impact for each of the respective memory devices and ranking the scores for the respective memory devices. For example, the method 540 can include generating, using the host, workload thermal impact scores (e.g., thermal quality scores) for the respective memory devices and ranking the workload thermal impact scores for the respective memory devices. The method can further include managing, using the host, workload allocation for the memory devices based, at least in part, on the ranked scores. As described above, the scores (e.g., the workload thermal impact scores) can be generated and/or ranked by a workload thermal impact score component such as the workload thermal impact score component 314 illustrated in FIG. 3.

In some embodiments, the method 540 can include determining thermal characteristics for respective sectors of the respective memory devices and controlling workload allocation to respective sectors of the respective memory devices based, at least in part, on the determined thermal characteristics for the respective sectors of the respective memory devices, as described above.

The method 540 can further include monitoring respective workloads running on the memory devices and assigning respective scores that are indicative of a workload thermal impact (e.g., workload thermal impact scores) to workloads running on the memory devices based, at least in part, on a change in the thermal characteristics measured by the memory devices corresponding to execution of the workloads by the memory devices. In addition, the method 540 can include assigning a total score (e.g., a total workload thermal impact score) to each of the memory devices. The total score can correspond to a summed total of the respective scores for all workloads running on each of the memory devices. The method 540 can further include determining that a workload to be subsequently executed by the memory devices is substantially similar in scope to a workload running on at least one of the memory devices. In some embodiments, the method 540 can further include assigning a score indicative of the thermal workload to the workload to be subsequently executed that is the same as the score assigned to the workload that is substantially similar in scope to the workload to be subsequently executed and managing workload allocation for the memory devices by assigning the workload to be subsequently executed to a memory device that has a total score that is less than the total score for at least one of the other memory devices.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a set of processing resources resident on a host and configured to:
receive information corresponding to thermal characteristics of a memory device coupled to the host;
monitor workloads running on the memory device;
assign respective scores indicative of the workloads running on the memory device based, at least in part, on a change in the thermal characteristics measured by the memory device corresponding to execution of the workloads;
determine that a workload to be subsequently executed by the memory device is substantially similar in scope to a workload running on the memory device;
assign a score to the workload to be subsequently executed by the memory device that is the same as the score assigned to the workload running on the memory device that is substantially similar in scope to the workload to be subsequently executed;
perform a thermal leveling operation for the memory device based, at least in part, on the received thermal characteristics, wherein performance of the thermal leveling operation comprises preemptive performance of the thermal leveling operation for the memory device in response to execution of the subsequently executed workload; and
cause the subsequently executed workload to be executed by the memory device.

2. The apparatus of claim 1, wherein the information corresponding to the thermal characteristics corresponds to at least one of a temperature of the memory device or an amount of power consumption of the memory device, or both.

3. The apparatus of claim 1, wherein the set of processing resources are further configured to:
determine, based on the received information, that the thermal characteristics of the memory device exceeds a threshold range; and
manage assignment of a workload to the memory device as part of performance of the thermal leveling operation for the memory device in response the determination.

4. The apparatus of claim 3, wherein the set of processing resources are configured to manage assignment of the workload to the memory device by refraining from assigning a workload to the memory device.

5. The apparatus of claim 3, wherein the set of processing resources are configured to manage assignment of the workload to the memory device by reassigning a workload from the memory device to a different memory device coupled to the host.

6. The apparatus of claim 1, wherein the set of processing resources are further configured to:
determine, based on the received information, that the thermal characteristics of the memory device are within a particular range; and
assign a workload to the memory device as part of performance of the thermal leveling operation for the memory device in response the determination.

7. The apparatus of claim 1, wherein the set of processing resources are further configured to:
receive information corresponding to thermal characteristics of sectors of the memory device; and
control workload allocation to the sectors of the memory device based, at least in part, on the received information corresponding to the thermal characteristics of the sectors of the memory device.

8. An apparatus, comprising:
a set of processing resources configured to:
receive thermal characteristics corresponding to a plurality of memory devices;
allocate, based on the received thermal characteristics, workloads to the plurality of memory devices;
monitor the workloads running on the plurality of memory devices;
assign respective scores to the workloads running on the plurality of memory devices based, at least in part, on a change in the thermal characteristics measured by a first memory device among the plurality of memory devices corresponding to execution of the workloads;
determine that a workload to be subsequently executed by a second memory device among the plurality of memory devices is substantially similar in scope to a workload running on the first memory device;
assign a score to the workload to be subsequently executed by the second memory device that is the same as the score assigned to the workload that is substantially similar in scope to the workload to be subsequently executed;
preemptively perform a thermal leveling operation for the second memory device in response to execution of the subsequently executed workload; and
cause the subsequently executed workload to be executed by the second memory device.

9. The apparatus of claim 8, wherein the thermal characteristics includes at least one of a temperature characteristic and a power consumption characteristic corresponding to respective memory devices among the plurality of memory devices.

10. The apparatus of claim 8, wherein the set of processing resources is resident on a host computing device coupled to the plurality of memory devices.

11. The apparatus of claim 8, wherein the set of processing resources is further configured to send a command to a controller resident on the memory devices to request the thermal characteristics.

12. The apparatus of claim 8, wherein the set of processing resources is configured to allocate the workloads to the plurality of memory devices as part of a wear leveling operation performed on the memory devices by the set of processing resources.

13. The apparatus of claim 8, wherein the set of processing resources is further configured to:
assign a score indicative of a thermal workload to each memory device among the plurality of memory devices based, at least in part, on the thermal characteristics corresponding to the plurality of memory devices; and
allocate the workloads to the plurality of memory devices based, at least in part, on the respective scores for each memory device.

14. A system, comprising:
a plurality of memory devices; and
a host coupled to the plurality of memory devices and configured to:
monitor thermal characteristics of the memory devices;
monitoring workloads running on the memory devices;
assign a workload to a particular memory device among the plurality of memory devices based, at least in part on the monitored thermal characteristics of the particular memory device;
assign respective scores indicative of a workload thermal impact to workloads running on the plurality of memory devices based, at least in part, on a change in the thermal characteristics measured by the plurality of memory devices and corresponding to execution of the workloads;

determine that a workload to be subsequently executed by at least one of the memory devices is substantially similar in scope to a workload running on the particular memory device;

assign a score indicative of a workload thermal impact to the workload to be subsequently executed by the different one of the memory devices that is the same as the score assigned to the workload that is substantially similar in scope to the workload to be subsequently executed;

cause execution of the subsequently executed workload; and perform a second thermal leveling operation for the memory device in response to executing the subsequently executed workload.

15. The system of claim 14, wherein the host is configured to assign the workload to the particular memory device based on a determination that the thermal characteristics of the particular memory device correspond to the particular memory device having a temperature lower than at least one other memory device among the plurality of memory devices.

16. The system of claim 14, wherein the host is configured to assign the workload to the particular memory device based on a determination that the thermal characteristics of the particular memory device correspond to the particular memory device consuming a lower amount of power than at least one other memory device among the plurality of memory devices.

17. The system of claim 14, wherein the host is configured to re-assign the workload to the particular memory device from a different memory device among the plurality of memory devices, and wherein the different memory device has a monitored thermal characteristic that is greater than a monitored thermal characteristic of the particular memory device.

18. The system of claim 14, wherein the host is configured to perform a wear leveling operation on the plurality of memory devices as part of assigning the workload to the particular memory device.

19. The system of claim 14, wherein the host is further configured to:

monitor respective sectors of the plurality of memory devices to determine a score indicative of a thermal workload of each of the respective sectors; and assign the workload to the particular memory device based, at least in part, on a determination that the score of respective sectors of the particular memory device have a lower score than a score corresponding to respective sectors of at least one other memory device among the plurality of memory devices.

20. The system of claim 14, wherein the host comprises a processing resource configured to execute an operating system to manage the plurality of memory devices.

21. A method, comprising:

receiving, by a host, information corresponding to thermal characteristics of a memory device coupled to the host;

performing a first thermal leveling operation on the memory device based, at least in part, on the received thermal characteristics;

monitoring workloads running on the memory device;

assigning respective scores indicative of a workload thermal impact to workloads running on the memory device based, at least in part, on a change in the thermal characteristics measured by the memory device corresponding to execution of the workloads;

determining that a workload to be subsequently executed by the memory device is substantially similar in scope to a workload running on the memory device;

assigning a score indicative of a workload thermal impact to the workload to be subsequently executed by the memory device that is the same as the score assigned to the workload that is substantially similar in scope to the workload to be subsequently executed;

executing the subsequently executed workload; and performing a second thermal leveling operation for the memory device in response to executing the subsequently executed workload.

22. The method of claim 21, wherein the information corresponding to the thermal characteristics corresponds to at least one of a temperature of the memory device and an amount of power consumption of the memory device.

23. The method of claim 21, further comprising:

receiving information corresponding to thermal characteristics of each sector of the memory device; and controlling workload allocation to each sector of the memory device based, at least in part, on the received information corresponding to the thermal characteristics of each sector of the memory device.

24. The method of claim 21, further comprising managing assignment of workloads to the memory device based, at least in part, on the received thermal characteristics.

25. A method, comprising:

determining, at a host computing system that controls operation of a plurality of memory devices communicatively coupled to the host computing system, a thermal characteristic for each respective memory device of the plurality;

monitoring respective workloads running on the memory devices;

assigning scores indicative of a workload thermal impact to workloads running on the memory devices based, at least in part, on a change in the thermal characteristics measured by the memory devices corresponding to execution of the workloads by the memory devices;

assigning a total score to each of the memory devices, wherein the total score corresponds to a summed total of the respective scores for all workloads running on each of the memory devices;

determining that a workload to be subsequently executed by the memory devices is substantially similar in scope to a workload running on at least one of the memory devices;

assigning a subsequent score indicative of a workload thermal impact to the workload to be subsequently executed that is the same as the score assigned to the workload that is substantially similar in scope to the workload to be subsequently executed; and managing, at the host, workload allocation for the plurality of memory devices based, at least in part, on the determined thermal characteristics for the respective memory devices and by assigning the workload to be subsequently executed to a memory device that has a total score that is less than the total score for at least one of the other memory devices.

26. The method of claim 25, further comprising:

determining that a first memory device of the plurality of memory devices is operating within a first temperature range;

determining that a second memory device of the plurality of memory devices is operating within a second temperature range, wherein the first temperature range comprises temperatures greater than temperatures of the second temperature range; and allocating, using the host, a workload to the second memory device based, at least in part, on determining that the second memory device is operating within the second temperature range.

27. The method of claim 25, further comprising:

determining that a first memory device of the plurality of memory devices is operating within a first power consumption range;

determining that a second memory device of the plurality of memory devices is operating within a second power consumption range, wherein the first power consumption range comprises a power consumption value greater than power consumption values within the second power consumption range; and allocating, using the host, a workload to the second memory device based, at least in part, on determining that the second memory device is operating within the second power consumption range.

28. The method of claim 25, further comprising:

generating, using the host, scores indicative of a workload thermal impact for each of the respective memory devices;

ranking the scores for the respective memory devices; and managing, using the host, workload allocation for the memory devices based, at least in part, on the ranked scores.

29. The method of claim 25, further comprising:

determining thermal characteristics for respective sectors of the respective memory devices; and controlling workload allocation to respective sectors of the respective memory devices based, at least in part, on the determined thermal characteristics for the respective sectors of the respective memory devices.

30. The method of claim 25, further comprising managing, using the host, workload allocation for the memory devices as part of a wear leveling operation performed on the memory devices.

* * * * *